Figure 1:
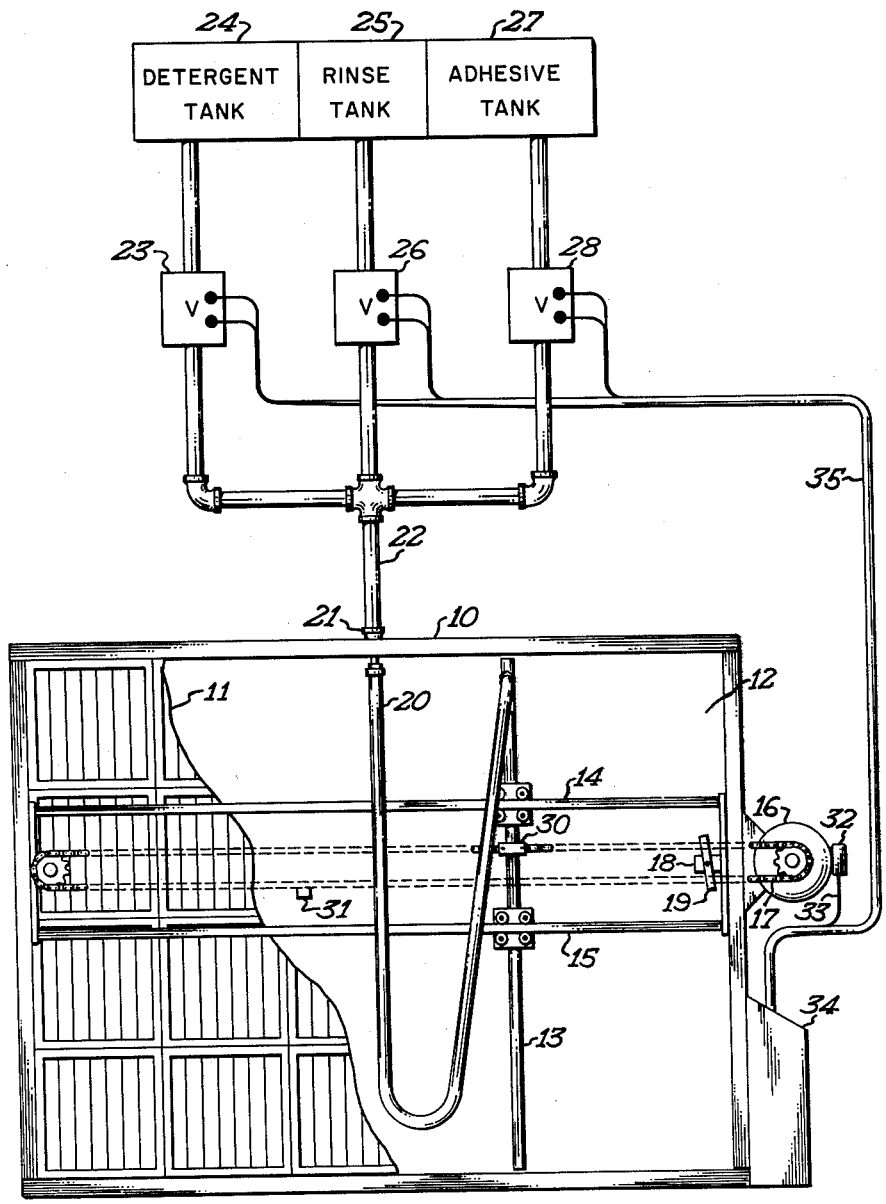

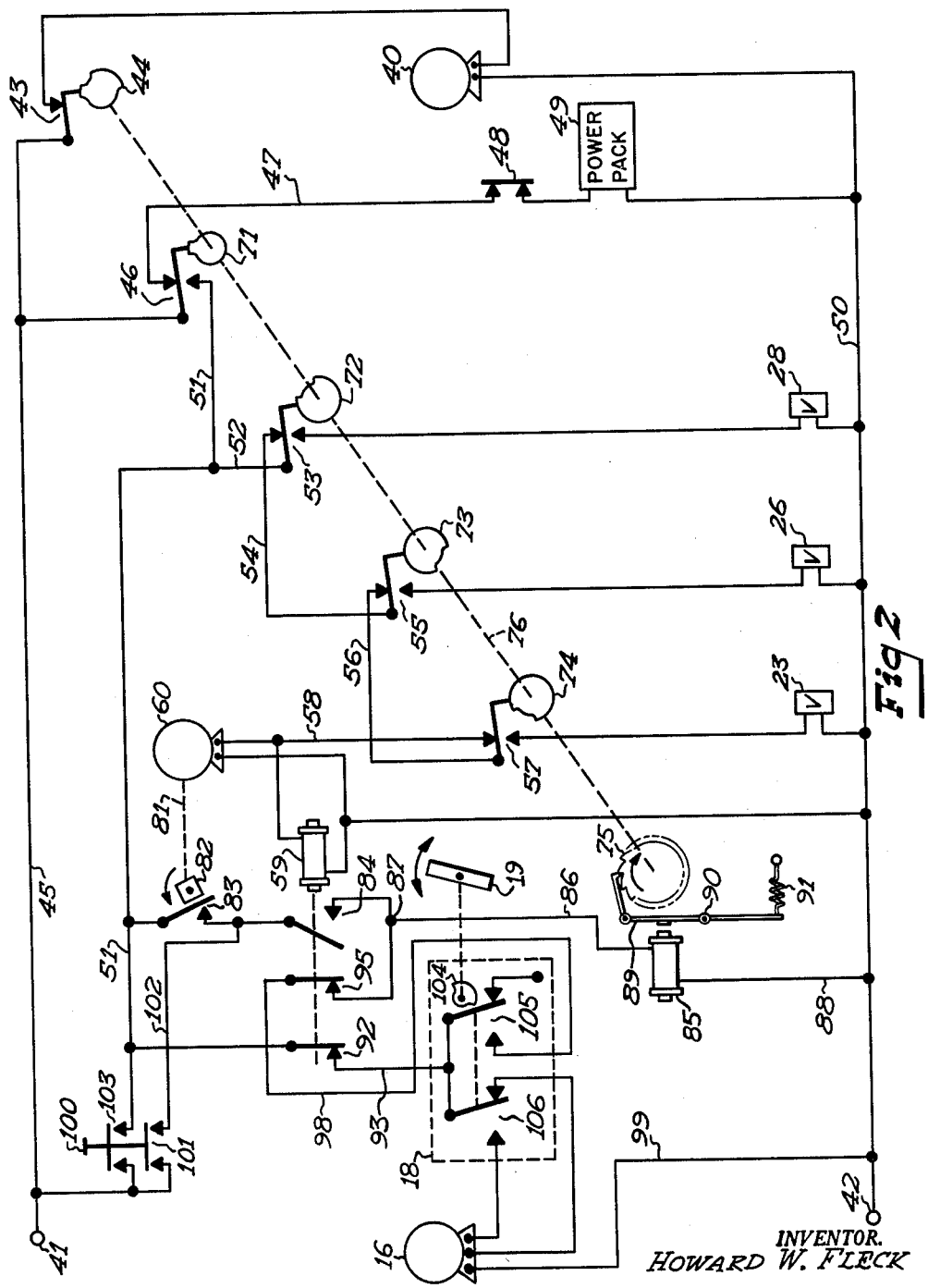

United States Patent Office 3,156,547
Patented Nov. 10, 1964

3,156,547
CONTROL APPARATUS FOR GAS CLEANING
DEVICES
Howard W. Fleck, Wabash, Ind., assignor to
Honeywell Inc., a corporation of Delaware
Filed Nov. 2, 1961, Ser. No. 149,749
4 Claims. (Cl. 55—118)

The present invention relates to an automatic sequencer for washing mechanism used in electronic or electrostatic air cleaners, and more particularly to a sequencer adapted to respond for certain periods to the time needed for a movable wash manifold to travel across the face of an electronic air cleaner and to respond for other periods to predetermined time intervals, the combination of the two periods defining a treating cycle.

The typical air cleaner installation is normally assembled in building block fashion from a plurality of standard cells. It will be appreciated that since these electronic air cleaners may vary in total area, the washing mechanism which cleans the air cleaner electrodes must be adapted or adjusted to cover the particular area defined by the total number of cells used. This means that no one single sequence timer can control for all installations the washing mechanism of the movable manifold type, i.e., the type which travels back and forth across the face of the electronic air cleaner. The problem then encountered is to develop one single automatic sequence timer or controller which controls and operates the washing mechanism for all of the various sizes of electronic air cleaner installations.

In prior cleaning systems, the sequence timer would require separate and individual adjustments for each installation to allow for the variations in time taken by the wash manifold to move across the air cleaner. This necessitated that a technician or an attendant adjust the unit for the specific installation. For example, if the air cleaner unit contained a total of nine basic cells, three cells wide and three cells high, the sequence timer would be adjusted for one period of time as required by the wash manifold to move across the air cleaner cell area. However, should the electronic air cleaner consist of a total of 15 cells, five cells wide and three cells high, the same timer would require a different adjustment, since it would now take the wash manifold a much longer time to move across the cell area. Hence, prior systems had no cooperation or automatic adjustment between the sequence timer and the area cleaned by the wash manifold.

The purpose of this invention is to eliminate the necessity of making separate and individual adjustments to the sequence timer for each specific electronic air cleaner installation. Furthermore, this invention insures that the sequence timer and the wash manifold cooperate with one another irregardless of air cleaner size. The invention provides for a sequence timer which when initiated by the pressing of a start button shuts off the power to the electronic air cleaner, stops a blower, and initiates the wash manifold to apply one of various fluids to the cells within the air cleaner. The sequence timer counts the number of times the wash manifold moves back and forth across the area requiring cleaning and when the required number of passes has occurred, the timer stops the wash manifold. The timer then holds the manifold in a static condition a predetermined time before it again turns the wash manifold on for a series of rinse steps or for other steps required in the wash cycle. The significant part of this invention is that the sequence timer is responsive to the movements of the wash manifold and is in part controlled by the wash manifold. Hence, the sequence timer adapts to all electronic air cleaner installations cleaned by a movable wash manifold.

An object of this invention is to provide an improved automatic wash sequencer to control a movable treating manifold associated with an electronic air cleaner.

Another object of this invention is to provide an automatic wash sequencer which responds to either a large or a small electronic air cleaner and which automatically adjusts to the electronic air cleaner in a manner that permits the same sequencer to operate on all cleaners without the necessity of making individual adjustments in the field.

These and other objects of the invention will be apparent from the following description and claims, and will be more readily understood by reference to the accompanying drawings wherein the circuit connections and mechanisms of the preferred embodiment are shown diagrammatically.

FIGURE 1 is a general pictorial diagram of the system required for washing an electronic air cleaner, and FIGURE 2 is the schematic diagram of the sequencer used in FIGURE 1.

FIGURE 1 shows a support frame 10 which is generally placed around and holds a plurality of cells 11 in an air duct to form the electronic air cleaner. The cells 11 comprise both the ionizing and collecting sections of the cleaner and are placed within the area 12 in a building block fashion. A wash manifold or head containing a plurality of individual spray nozzles is shown generally at 13 and is mounted on fixed tracks 14 and 15 which in turn are attached to frame 10. The manifold 13 is driven in either direction by a motor 16 which can be any reversing type motor. The rotation of motor 16 is converted to linear motion to move manifold 13 by a chain 17.

Considering FIGURE 1 as being the front view of an electronic air cleaner, the wash manifold 13 would normally be positioned at the extreme right or left end of support frame 10 when the electronic air cleaner is removing dirt particles from the air. During the washing operation, the manifold 13 is moved from one side of the electronic air cleaner to the opposite side. As the manifold reaches the opposite side, the motor 16 is reversed, and the manifold 13 returns to its original position, completing one cycle of manifold operation.

During the movement of the wash manifold 13 across the area 12, one of various liquids is applied to the cells 11 from manifold 13. The liquids are supplied to manifold 13 as it moves back and forth across the area 12 through a hose 20. The hose 20 is connected to a fixed coupling 21 mounted on frame 10, coupling 21 is in turn connected to distribution piping 22. A solenoid valve 23 is connected between piping 22 and a detergent tank 24. So also, a rinse water tank shown at 25 supplies water through a solenoid valve 26, to piping 22 and eventually to the manifold 13. Similarly, an adhesive storage tank 27 supplies through a solenoid valve 28, an adhesive to piping 22 to insure dirt particle adhesion to the cells of the electronic air cleaner and to prevent dirt particle blow-off. It is to be understood that the liquids are applied under pressure and that this pressure can be generated in any number of ways of which one is by using a pump (not shown) operated in conjunction with valves 23, 26 and 28.

An enclosed switch 18, mounted on or near motor 16, reverses the direction of rotation of the motor in response to the position of manifold 13. As manifold 13 reaches the right extreme of its travel, a bracket 30 mounted thereon strikes a pivoted lever 19 causing lever 19 to rotate about its pivot. As the manifold reaches the other or left extreme of travel, a striker arm 31, mounted on chain 17, strikes lever 19 causing it to rotate in the opposite direction. Rotation of lever 19 operates reversing switch 18 as will be described later herein.

Motor 16 is connected to power through terminals in a junction box 32 and to a power source in a cabinet 34 through conductor 33. Cabinet 34 also contains the power supply for the electronic air cleaning cells 11 as well as the sequencer of this invention. An electrical conductor 35 connects the sequencer in cabinet 34 to the solenoid valves 23, 26 and 28.

FIGURE 2 is a schematic diagram of the sequencer in cabinet 34 and shows how it interconnects the motor 16 and the solenoid valves 23, 26 and 28. Further, it shows how the sequencer controls a blower motor 40 which forces air through the electronic air cleaner. The blower motor is energized from the power lines connected to terminals 41 and 42 through a switch 43 operated by cam 44. As cam 44 rotates, it opens and closes switch 43 starting or stopping motor 40.

From the power input terminal 41 a lead 45 is connected to a single pole double throw switch 46 which when in the up position connects the power at terminal 41, through lead 45, the contacts of switch 46, lead 47, interlock 48, to the electronic air cleaner power supply 49 located in cabinet 34. The return power path is by way of a common bus 50, which is connected to the other side of the power line at terminal 42. When switch 46 is in the down position, it connects power at terminal 41, through lead 45, to a common conductor 51. A lead 52 connects the conductor 51 to a single pole double throw switch 53. When switch 53 is in the down position, with switch 46 also in the down position, adhesive is applied to area 12 as the solenoid operator of valve 28 is energized from terminal 41, through lead 45, common conductor 51, lead 52, switch 53, solenoid 28, common bus 50 and thence to terminal 42. When switch 53 is in the up position, lead 52 is connected to lead 54 and to a single pole double throw switch 55.

If switch 55 is in the down position it energizes the solenoid of valve 26 from the terminal 41 to apply rinse water to the manifold 13 and thence to area 12. When switch 46 is in the down position and switches 53 and 55 are in the up position, lead 52 is connected through switch 53, lead 54, switch 55, lead 56, to a single pole double throw switch 57. Switch 57 when in the down position connects the solenoid of valve 23 across the power input terminals 41, 42 to apply a detergent to the area 12. Placing switch 46 in the down position and switches 53, 55 and 57 in the up position, lead 52 is connected to lead 58 and to the parallel combination of a transfer relay coil 59 and a timer motor 60. The timer motor 60 can be a synchronous motor or any other motor type, its purpose being to merely rotate at a relatively uniform rate when energized.

Switches 46, 53, 55 and 57 are periodically operated by cams 71, 72, 73 and 74 respectively. Cams 44, 71, 72, 73 and 74 are connected through a mechanical linkage 76 to an index wheel 75 having on its periphery a plurality of teeth. All of these cams are constructed to have portions on their peripheries arranged according to a predetermined manner to activate respective switches. In the preferred embodiment, the cams have arranged on their peripheries detents into which a lever falls operating the associated switch. Thus it is seen that index wheel 75 and the cams driven thereby constitute a programmer or programming section for the device.

The timer motor 60 is connected through a mechanical linkage 81 to a rotatable multi-point switch actuator 82 which operates a momentary contact switch 83. Switch actuator 82 is shown in FIGURE 2 as having four contactors, however, any number can be used. This switch 83 produces periodic pulses or signals at a relatively uniform rate when motor 60 is connected across terminals 41, 42 through switches 46, 53, 55 and 57.

From switch 83, power is available from common lead 51 when normally opened relay contacts 84 are closed, to a junction 87, lead 86 and to an advance or drive coil 85. The advance coil 85 is in turn connected through lead 88 to the common bus 50. Advance coil 85, when energized by current flowing through it, magnetically pulls a mechanical pawl 89, pivoted around point 90, rotating the index wheel 75 in a clockwise direction to advance cams 44, 71, 72, 73 and 74. The pawl 89 is biased to permit operation of index wheel 75 by a suitable mechanical biasing device such as a spring member 91. Thus the programmer including index wheel 75 is rotated one step in a clockwise direction each time coil 85 receives a pulse or signal.

A second path for applying a signal or pulse from lead 51 to advance coil 85 is through relay contacts 92 which are normally closed, lead 93, normally opened contacts 105, lead 98, relay contacts 95 which are normally closed and thence to junction 87. The advance coil 85 is energized in one direction of travel of manifold 13 and is de-energized in the opposite direction. This drives the index wheel 75 clockwise in accordance to movements of the manifold 13 as it reaches the limit of its travel across the area 12.

A manually operated momentary contact start switch 100 provides two functions of which one is to energize advance coil 85 and relay coil 59 at the initial start time. This switch has one set of contacts 101 which when closed apply power to advance coil 85 from input terminal 41, through lead 102, relay contacts 84 when closed by simultaneously activation of relay 59, and lead 86. The power for energizing relay 59 is obtained by the closing of contacts 103 applying power to common lead 51, switches 46, 53, 55, 57, lead 58 and thence to relay 59.

Power for energizing the wash manifold drive motor 16 is supplied from common lead 51, through normally closed relay contacts 92, lead 93, and thence to reverse switch 18. Switch contact 106 is moved to reverse the direction of rotation of motor 16 whenever actuator or striker arm 31 or manifold bracket 30 strikes lever 19, rotating cam 104, to shift switch contacts 105 and 106, from one position to the other.

*Operation*

The sequence of operation of the system will now be described. When the electronic air cleaner must be cleaned, the attendant will momentarily push START switch 100 which will close contacts 101 and contacts 103, and initiate the wash operation or cycle described below. The closure of contacts 103 will supply power from terminal 41 through closed contacts 103, common lead 51, lead 52, switch 53 which is normally in the up position, lead 54, switch 55 which is normally in the up position, lead 56, switch 57, which is also in the up position, lead 58, and thence to the parallel combination of timer motor 60 and relay 59. The energization of relay 59 will open relay contacts 92 thereby removing power to lead 93, and also open relay contacts 95 preventing energization of advance coil 85 from the reverse switch 18. At the same instant of time, relay contacts 84 close, and power is applied to advance coil 85 from terminal 41 through contacts 101, lead 102, closed contacts 84, junction 87, lead 86, advance coil 85, lead 88 and thence to terminal 42. Current flowing through advance coil 85 will cause it to pull pawl 89 back to engage a tooth on index wheel 75. When the start switch is released, coil 85 is de-energized causing pawl 89 to move forward due to spring 91 rotating index wheel 75 one notch clockwise. This one notch rotation of index wheel 75 in the clockwise direction will: rotate cam 44 which will open the power lead for fan motor 40, rotate cams 72, 73, 74, which do not operate their associated switches at this time, and rotate cam 71 which will cause switch 46 to move from its normal up position to its down position thereby connecting power to common lead 51 and disconnecting power to the power pack 49 which turns OFF the electronic air cleaner.

As relay 59 is in parallel with timer motor 60, motor 60 will start to rotate and will turn the multi-point cam 82 to momentarily close switch 83. Every time switch 83 closes, it connects power from lead 51, through closed contacts 84, junction 87, lead 86 and drive or advance coil 85 through lead 88, and to the other side of the power line at 42. In the preferred embodiment, a period of five minutes will lapse before cams 72, 73 and 74 operate their associated switches to start a new period of the wash cycle. This period is assumed as five notches or teeth or advance on the index wheel 75, and this time lapse is used to allow the fan motor 40 to coast to a complete stop. When five pulses or momentary closures of switch 83 have occurred, the index wheel 75 has rotated an amount that causes cam 74 to move switch 57 from the up to the down position which opens the circuit to the timer motor 60 and the relay 59. Now, the power present at lead 56 is applied to the solenoid valve 23 which permits detergent to flow under pressure to the wash manifold 13 shown in FIGURE 1.

The opening of the power lead to the timer motor 60 and relay 59 causes the relay contacts 92 and 95 to close and the contacts 84 to open. In this condition, the energization of advance coil 85 will be disconnected from the momentary switch 83 and transferred to the operation of reverse switch 18 and contact 105. Power is supplied from lead 51, through closed relay contact 92, lead 93, through reversing switch contacts 106 to start the motor and also through switch contacts 105, lead 98, closed relay contact 95, lead 86, advance coil 85, lead 88, bus 50 and to terminal 42. The motor 16 will drive the wash manifold 13 from one extreme end of the area 12 across the air cleaner cells 11 to the other end. At the same time, the detergent solenoid is opened and detergent is sprayed on the cells of the electronic air cleaner. When the wash manifold 13 reaches the extreme end of the area 12, striker arm 31 will but against actuator lever 19 reversing switch contacts 105 and 106 so as to reverse motor 16 and hence, reverse the movement of manifold 13. At this time, advance coil 85 is energized. As the manifold 13 moves towards its original position, the manifold bracket 30 butts against actuator lever 19 reversing switch 18, de-energizing advance coil 85. At this instant, index wheel 75 moves another notch in the clockwise direction. In the preferred embodiment, two complete cycles of the wash manifold 13 spraying detergent occur before the index wheel 75 rotates cams 44, 71, 72, 73 and 74 to where the cam 74 moves switch 57 to the up position de-energizing the solenoid valve 23 thereby shutting off the detergent supplied to wash manifold 13. Instantly, the timer motor 60 and relay 59 are again energized since the cams 71, 72 and 73 have not rotated sufficiently to actuate the switches 46, 53 or 55. Hence, the washer motor 16 is de-energized and the advance coil is disconnected from reversing switch 18. Reversing switch 18 effectively synchronizes the sequencer to the movable wash manifold and provides for the automatic adjustment to any size electronic air cleaner. The advance coil 85 is transferred by the action of relay 59, from the reversing switch 18 to the switch 83. Hence, as the timer motor 60 rotates, it again momentarily closes switch 83 to energize advance coil 85 to rotate wheel 75.

In the preferred embodiment, the sequencer of FIGURE 2 mounted in cabinet 34 allows the detergent to soak for approximately eight minutes. After eight minutes, the index wheel 75 has rotated sufficiently that cam 73 permits switch 55 to move from the up position to the down position. This will energize the rinse solenoid 26 and de-energize timer motor 60 and relay 59. The sequence of events now is that the rinse water from tank 25 is applied by the wash manifold 13 to the cells within area 12. Also, the wash motor 16 is energized to move manifold 13 back and forth across the cells spraying rinse water on them. The rinsing will continue for a time which in the preferred embodiment is five cycles of operation of the wash manifold 13.

After the wash manifold 13 has completed its five cycles, the index wheel 75 has rotated sufficiently that the cam 73 moves switch 55 to the up position, and again, the timer motor 60 and the relay 59 are energized. This will disconnect and stop the manifold drive motor 16 and transfer the advance coil 85 to the switch 83. Hence, the timer motor 60 steps the index wheel 75.

After a period of approximately five minutes, the time allowed for the water sprayed on the cells in the electronic air cleaner to drip off, the index wheel 75 has rotated sufficiently to allow cam 44 to close switch 43. The closure of switch 43 starts the fan motor 40. The fan is allowed to remain ON for a period of 40 minutes as timed by the motor 60 to thoroughly dry the cells within the electronic air cleaner.

Since the blower does not stop instantaneously, and since it is undesirable to have a liquid sprayed into the duct system, the fan motor must have a coasting or stopping time. Therefore, after the 40 minute dry period, the index wheel 75 has rotated sufficiently to open switch 43, switches 57, 55 and 53 remain in the up position. The timer motor 60 will continue to actuate switch 83 stepping the index wheel 75 for another five minutes. After five minutes have elapsed, the index wheel 75 moves to a position which permits cam 72 to actuate the switch 53 moving it from the up position to the down position. Switch 53 will energize the adhesive solenoid valve 28 as well as deenergize the timer motor 60 and relay 59. The energization of solenoid 28 allows adhesive stored in tank 27 to be applied to the cells in the electronic air cleaner by the manifold 13. The application of this adhesive is generally applied in two cycles and after the two cycles of operation wash manifold 13 returns to its original position.

Since it is undesirable to have the fan 40 blow adhesive into the air ducts, approximately 12 minutes is permitted to lapse allowing the adhesive to dry on the cells. Again the time lapse is determined by timer motor 60. After the 12 minutes lapse, the electronic air cleaner is ready for normal service. To prepare the unit for service, the index wheel 75 has moved the cams 74, 73, 72, 71 and 44 to a position that brings cam 71 in a position to tend to move switch 46 from the down position to the up position. Instantaneously, the cam 44 has rotated to tend to close switch 43 energizing the fan motor 40. On the last index wheel 75, the cam 44 and 71 rotate to energize fan 40 and connect power supply 49 to the line. The movement of switch 46 from the down position to the up position disconnects power from lead 51 which in turn disconnects power to the timer motor 60 and the relay 59. Relay contacts 92 and 95 close and contacts 84 open. Switches 53, 55 and 57 are placed in the up position and the sequencer is ready to be initiated for another wash cycle by closing and opening the contacts on switch 100.

I wish to point out that although I have disclosed a preferred embodiment which has definite times to allow the various liquids to soak, drip or dry, or that I have allowed a certain number of cycles for the application of the various liquids, it is in no way construed as a limitation to my invention. It may be advantageous to increase or decrease the times in any manner or way, the prime objective being to efficiently and effectively clean the cells within an eletcronic air cleaner. Furthermore, I have disclosed a sequencer utilizing only three solenoid valves operated by three cams, a cam which controls the power to the power pack and a cam to control the fan which forces the air through the electronic air cleaner. Should it be necessary to provide additional steps, it would be obvious and easy to apply additional cams or additional solenoids to perform the intended functions. Also, should it be desirous to operate signal indicators from the cams, such as pilot lamps, it would be quite easy to attach to the cams or even to the index wheel through electrical leads or mechanical linkages any number of signal indicating devices. Furthermore, I have disclosed that the timer motor 60 be energized and de-energized according to the particular wash period. If this is not desirable, the motor 60 could be operated continuously as its function is to provide a source of uniform pulses or intervals which can be switched into or out of the system at will.

What I have disclosed as my invention is the concept for providing a fully automatic washing mechanism for an electronic air cleaner. This particular mechanism can be used on any size or type of electronic air cleaner without the necessity of making adjustments in the field. Furthermore, I wish to point out that the sequence timer which controls the washing mechanism is in synchronization with the wash manifold and is controlled by the wash manifold for portions of the wash cycle and at other times is controlled by a uniform time source, the two alternating to provide a wash cycle for all electronic air cleaners.

I claim:

1. In an air cleaner having a particle collecting area and a treating mechanism for the collecting area including a driving motor, a treating head adapted to be driven thereby to pass back and forth across said collecting area and to perform treating operations thereupon and a sequencer for controlling the operation of said treating mechanism to provide a treating cycle including portions of the cycle wherein said head is moved across said collecting area and treating operations are performed upon said area and portions of the cycle wherein said head is held stationary for fixed periods of time, said sequencer comprising; a programmer operable through a plurality of positions for controlling the operation of said driving motor during a treating cycle; electrically energizable advance means operably associated with said programmer and responsive to electrical signals to drive said programmer through said plurality of positions; an energization circuit for said driving motor; first switch means in said circuit for controlling energization of said driving motor; first signal means operable in response to movement of said treating head for supplying an electrical signal upon movement of said treating head across said area; circuit means including second switch means for electrically connecting said first signal means to said advance means; second signal means adapted to supply electrical signals at a substantially uniform rate; further circuit means including third switch means for electrically connecting said second signal means to said advance means; means including means operable by said programmer for operating said first, second, and third switch means to complete the energization circuit for said driving motor and to electrically connect said advance means only to said first signal means during portions of said cycle wherein said movable head is to be moved across said area, and to open said motor energization circuit and to electrically connect said advance means only to said second signal means during portions of said cycle wherein said movable head is stationary, the sequencer thereby being adaptable to any air cleaner to provide a predetermined number of passes of said treating head back and forth across the collecting area during each of said portions of said cycle wherein said head is moving without regard to the dimensions of the collecting area.

2. In an air cleaner having a particle collecting area and cleaning apparatus operable upon the collecting area and including a cleaning manifold, and an electrically energizable, reversible drive motor associated with said manifold for moving said manifold back and forth across the area of said collecting means to remove foreign material therefrom, a sequencer for controlling application of a cleaning cycle to said collecting means, which cycle includes portions wherein said cleaning manifold moves back and forth across the collecting means and other portions wherein the cleaning manifold is maintained in a fixed position for predetermined time periods, said sequencer comprising: a programmer driveable through a plurality of positions for controlling the operation of said cleaning apparatus during the cleaning cycle; driving means for said programmer, said driving means being responsive to an electrical pulse; first pulsing means adapted to be electrically connected to said programmer driving means for supplying electrical pulses thereto; switch means operable upon movement of said cleaning manifold to either of the extremes of its travel; an energizing circuit for said manifold drive motor, said energizing circuit including said switch means connected in controlling relationship with said motor for reversing the energization thereof upon movement of said manifold to either of the extremes of its travel; second pulsing means adapted to be electrically connected to said programmer driving means, said second pulsing means including means operable upon movement of said cleaning manifold back and forth between its two extremes of travel to supply an electrical pulse; further switch means operable by said programmer; and means including said further switch means to interrupt the energizing circuit for said manifold drive motor and to electrically connect said first pulsing means to said programmer driving means during portions of said cleaning cycle wherein said cleaning manifold remains in a fixed position, said last named means further being operable by said programmer to complete the energizing circuit for said manifold drive motor, to electrically disconnect said first pulsing means from said programmer driving means, and to electrically connect said second pulsing means to said programmer drive means during portions of said cleaning cycle wherein said cleaning manifold is moved back and forth back across said collecting area.

3. In a control apparatus for an air cleaning apparatus having collecting means for removing foreign material from the air and washing apparatus including a washing manifold movable back and forth across the area of said collecting means, electrically energizable, reversible driving means for the washing manifold, and electrical energizable valves operable to control the flow of fluids to said manifold to remove collected foreign material therefrom by application of a washing cycle which includes portions wherein the washing manifold moves back and forth across the collecting means and other portions wherein the washing manifold is maintained in a fixed position for predetermined time periods, said control apparatus comprising: programming means including switch operating means driveable through a plurality of positions for controlling the operation of said washing apparatus during the washing cycle; driving means operably connected to said programming means, said driving means being responsive to an electrical pulse; pulsing means including motor driven switch means for supplying electrical pulses at a fixed time rate; an energizing circuit for said manifold driving means; first switch means including first contact means in said energizing circuit for controlling said manifold driving means and second contact means operable to control the supply of electrical pulses; actuating means associated with said first switch means and responsive to movement of said washing manifold back and forth across said collecting area; said actuating means being effective upon movement of said washing manifold to either of the extremes of its travel to operate said first contact means to reverse the energization of the manifold driving means and to operate said second contact means to supply a pulse; first circuit means electrically connecting said pulsing means to said driving means of said programming means; second circuit means electrically connecting said second contact means to said driving means of said programming means. third circuit means providing energizing circuits for each of said plurality of electrically energizable valves; switch means operable by said programming means to interrupt the energizing circuit for said manifold driving means, to interrupt said second circuit means, and to close said first circuit means to connect said pulsing means to said driving means of said programming means during portions of said washing cycle wherein said washing manifold remains in a fixed position, said last named means further being operable by said programming means to complete said energizing circuit for said manifold driving means through said first contact means, to complete said second circuit means to connect said second contact means to said driving means for said programming means, and to open said first circuit means during portions of said washing cycle wherein said washing manifold is moved back and forth across said collecting area; and means including switch means operable by said programming means for controlling said energization circuits for said electrically energizable valves.

4. In an air cleaning apparatus having collecting means for removing foreign material from the air and washing apparatus including a washing manifold, a reversible electric motor means for driving said washing manifold back and forth across the area of said collecting means to remove collected foreign material therefrom, a plurality of solenoid valves for controlling the flow of cleaning and treating fluid to said manifold, and sequencing apparatus, said sequencing apparatus comprising: a programmer for controlling the operation of said washing apparatus and including a plurality of rotatable switch operating cams; driving means for said programmer and adapted to rotate said cams in response to an electrical pulse; pulsing means for supplying electrical pulses at a substantially uniform rate; first switch means including first contact means electrically connected in controlling relationship with the manifold driving motor means and second contact means for controlling the supply of electrical pulses; switch actuator means for said first switch means, said actuator means being positioned to be actuated upon movement of said manifold to either of its limiting positions to operate said first contact means for reversing the manifold driving motor means and for operating said second contact means to supply a pulse; electrically actuated relay means including second switch means movable between first and second positions; first circuit means including said first and second switch means and providing, when said second switch means is in said first position, an energizing circuit for said manifold drive motor means through and under control of said first contact means and a circuit electrically connecting said second contact means to said driving means for said programmer so that said first switch means supplies a pulse to said driving means upon movement of said manifold through one pass back and forth across said collecting area; second circuit means including said second switch means and, when said second switch means is in its second position, operably connecting said pulsing means to said programmer driving means; said second switch means, when in its second position, interrupting said first circuit means; a plurality of switches operable by said cams, said plurality of switches including one switch connected for controlling energization of each of said solenoid valves, each of said last named switches having first and second positions; third circuit means including each of said last named switches connected in series and defining, when each of said last named switches is in said first position, an energizing circuit for said pulsing means and said relay means, energization of said relay means resulting in movement of said second switch means to its second position; and further circuit means including an energizing circuit for each of said solenoid valves, each of said energizing circuits including one of said last named switches, said last named switches being so arranged that movement of any one of said switches to its second position interrupts said third circuit means to said pulsing means and said relay means and consequently resulting in movement of said second switch means to its first position, any one of said last named switches, when in its second position, completing the energizing circuit of the associated solenoid valve to supply fluid to said manifold.

References Cited in the file of this patent
UNITED STATES PATENTS

| | | |
|---|---|---|
| 2,167,185 | Preston | July 25, 1939 |
| 2,265,225 | Clark | Dec. 9, 1941 |
| 2,333,551 | Pegg | Nov. 2, 1943 |
| 2,448,045 | Pegg | Aug. 31, 1948 |
| 2,448,046 | Penney et al. | Aug. 31, 1948 |
| 2,591,404 | Carlson | Apr. 1, 1952 |
| 2,604,184 | Warburton et al. | July 22, 1952 |
| 2,615,529 | Lincoln | Oct. 28, 1952 |
| 2,634,735 | Buck | Apr. 14, 1953 |
| 2,706,990 | Lyman | Apr. 26, 1955 |
| 2,737,257 | Warburton | Mar. 6, 1956 |
| 2,902,113 | Luhr | Sept. 1, 1959 |
| 2,906,332 | Rosten et al. | Sept. 29, 1959 |